United States Patent [19]
Swinson et al.

[11] Patent Number: 5,293,100
[45] Date of Patent: Mar. 8, 1994

[54] CATHODE RAY TUBE BURN COMPENSATION

[75] Inventors: Peter R. Swinson, St Albans; Terence W. Mead, Hertford, both of United Kingdom

[73] Assignee: Rank Cintel Limited, United Kingdom

[21] Appl. No.: 988,169

[22] Filed: Dec. 9, 1992

[30] Foreign Application Priority Data

Jan. 21, 1992 [GB] United Kingdom ............ 9201252

[51] Int. Cl.⁵ .................... H01J 29/70; H01J 29/72
[52] U.S. Cl. ............................. 315/364; 348/103; 348/174
[58] Field of Search ............. 315/364; 358/242, 216, 358/347

[56] References Cited

U.S. PATENT DOCUMENTS 4,164,761  8/1979  Matchell ............................ 358/215
4,214,268  7/1980  Keznickl et al. .................. 358/127
5,179,314  1/1993  Walker et al. ..................... 315/10

FOREIGN PATENT DOCUMENTS 9007842  7/1990  PCT Int'l Appl. .

Primary Examiner—Theodore M. Blum
Attorney, Agent, or Firm—Ostrolenk, Faber, Gerb & Soffen

[57] ABSTRACT

Compensation for phosphor burn in a CRT scanner is achieved by offsetting the scan by half a line spacing on alternate scans when the film is stationary in the scanner. To avoid unpleasant effects the offset scan output is supressed and the previous frame output frozen in the frame store 24. The previous frame is output again from the frame store in place of the offset scan output.

Offset scanning is not performed when a control adjustment is made to avoid a juddering effect on the displayed output.

19 Claims, 1 Drawing Sheet

CATHODE RAY TUBE BURN COMPENSATION

FIELD OF THE INVENTION

This invention relates to cathode ray tubes (CRTS) and in particular to compensation for burning of CRT phosphor by the CRT electron beam. The invention is particularly applicable to cathode ray tubes used in flying spot scanning equipment.

BACKGROUND TO THE INVENTION

When a flying spot CRT is operated for prolonged periods (several hours) the efficiency of the phosphor generally falls over those parts of the tube which have been scanned.

It is known to correct for the variations in brightness so produced in a film scanner by means of a photosensor directed at the face of the CRT, providing a correction signal, which is then divided into the video signal from the main photosensors (which receive light through the film being scanned). It is also known to avoid the horizontal bands which would otherwise result when the telecine is operating with the film moving (the scan height is reduced to compensate for the film movement), by slowly moving the scan up and down the CRT face and compensating for this motion by modulating the movement of the film. The scan may be moved by up to one half of the film frame height.

A particular aspect of this problem is that when the scan line is well focussed it can produce not just a patch on the phosphor, but will cause individual lines to be burned into the phosphor. Because of the close spacing these lines are not usually a problem in themselves, however if a different size of scan patch is subsequently applied with the same number of scanning lines, then a beat pattern results appearing as dark and light bands on the resultant picture and sometimes referred to as venetian blind effect. This effect could be corrected by the photosensor compensating system described above though this will itself introduce additional noise and shading and will not be fully effective for all colours. The previously described slow movement of the scan when the film is moving will avoid causing the burned in scan lines. However, it is common practice that a telecine be operated for long periods of time with the film stationary, when adjusting and assessing colour corrections for example.

SUMMARY OF THE INVENTION

The invention, therefore, aims to solve the problem of line burn when the film is stationary.

According to the invention there is provided a method for compensating for phosphor burn in the Cathode ray tube of a flying spot film scanner, comprising scanning a frame of film to produce a video signal representative of an image exposed on the film frame, storing the video signal in a frame store for output, offsetting the vertical scan of the scanner by a distance equal to a non-integral scan line spacing, rescanning the frame in the offset position, supressing the video signal produced by the offset scan, and repeating the signal stored in the frame store in place of the supressed signal.

The invention also provides apparatus for compensating for phosphor burn in the cathode ray tube of a flying spot film scanner, comprising means for controlling scanning of a frame of film by the beam of the cathode ray tube to produce a video signal representative of an image exposed on the film frame, and means for storing the video signal for output, characterised in that the scanning control means comprising means for offsetting the vertical scan of the scanner by a distance equal to a non-integral scan line spacing and for controlling rescanning of the film frame with the vertical scan offset, and by means for supressing the video signal output by the offset rescanning, and means for repeating the video signal stored in the frame store in place of the supressed signal.

In essence the invention scans between normal scan lines on alternate scanning frames to burn the CRT phosphor more evenly.

The signal produced by the interline scan is supressed and replaced by the signal produced in the normal scan which is repeated.

The interline scanning is achieved by offsetting the vertical scan by a non-integral number of line spacings. This offset is preferably less than one interline spacing but may be more. In a preferred embodiment the offset is half the line spacing.

In one embodiment a number of offset scans are performed, each offset by a different amount. This has the advantage of producing a more even burn especially when the scan is coarse or a high resolution scan, for example to produce a high definition image.

The invention in its various embodiments prevents the venetian blind effect by equalising burn over the CRT face. It may be used when the film is stationary in conjunction with the slow vertical scan method used when the film is moving. It may also be used in an intermittent motion telecine where film is pulled down frame by frame using a pin register gate.

The invention also resides in a telecine including apparatus defined.

An embodiment of the invention will now be described with reference to the accompanying drawings, in which:

DESCRIPTION OF BEST MODE

Figure 1:
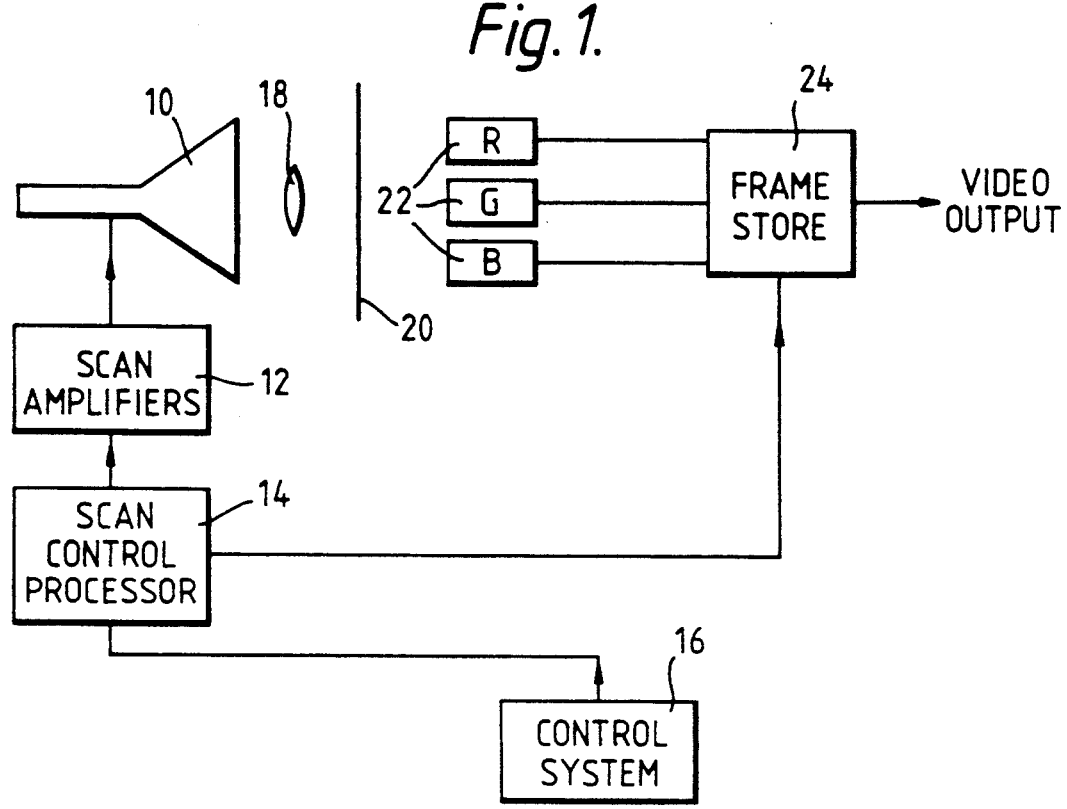
FIG. 1 is a simplified block diagram of parts of a flying spot telecine relevant to the present invention.

The telecine illustrated in part in FIG. 1 is a flying spot telecine sold under the trade mark URSA by Rank Cintel Limited of Ware, Hertfordshire, England. Aspects of the scanning circuitry and other features of the URSA telecine are described in International Patent Application WO90/07842, the content of which is incorporated herein by reference.

The telecine comprises a flying spot scanner including a cathode ray tube 10 the beam of which is driven by scanning amplifiers 12 under the control of a scan control processor 14 and an operator controlled control system 16. The telecine operates by scanning the CRT to produce an unmodulated raster, which is then imaged through lens 18 onto the cine film 20. The light passing through the film is collected and converted into video signals by three photomultipler tubes 22 R, G, B. The film is thus scanned in line sequential fashion one film frame at a time, the conventional line interlaced television signal being produced by manipulation of the signal in a frame store 24. When the film is stationary the telecine by convention repeatedly scans one film frame.

In this embodiment of the invention the scan is alternated between its normal position and a position where the lines are traced midway between the lines of the normal scan. In other words, the scan is displaced by half a line.

The shifting of the scan to produce an interline scan is performed by the scan control processor 14 which adds a ½ line offset to the scan signal. The URSA scanning system as described in WO90/07842 uses a digital scanning map and the offset is achieved by incrementing the vertical scan address by an amount equivalent to one half line spacing.

The scan shifting is performed on alternate scanning frames when the film is stationary in the telecine. This is determined by reference to a scan frame pulse produced by the scan control processor 14. It is undesirable to display the output of the half line shifted scan as, if uncorrected, it might produce a flickering on detailed pictures. To avoid this, the previous normal scan position frame is repeated during the offset scan. This is achieved by freezing the telecine frame store 24 on alternate frames. Again, this task is performed by the scan control processor 14 with reference to the scan frame pulse. The scan control processor 14, which is connected to the frame store 24, sends a freezing signal to the frame store 24 so that the video output from the frame store is a repeat of the previous frame output.

As mentioned, interline scanning is only performed when the film is not moving through the URSA telecine. When the film is moving, the known slow vertical scan movement described previously operates to compensate for line burn.

As the video output only changes every two frames, control adjustments made by the telecine operator would only appear to change every other frame giving a juddering effect. As this is undesirable the interline scanning is disabled by the scan control processor when it receives a signal from the control system 16 indicating that a control adjustment has been made. In practice, this accounts for a small proportion of the time for which the telecine is in still mode and so does not contribute greatly to phosphor burn.

Figure 2:
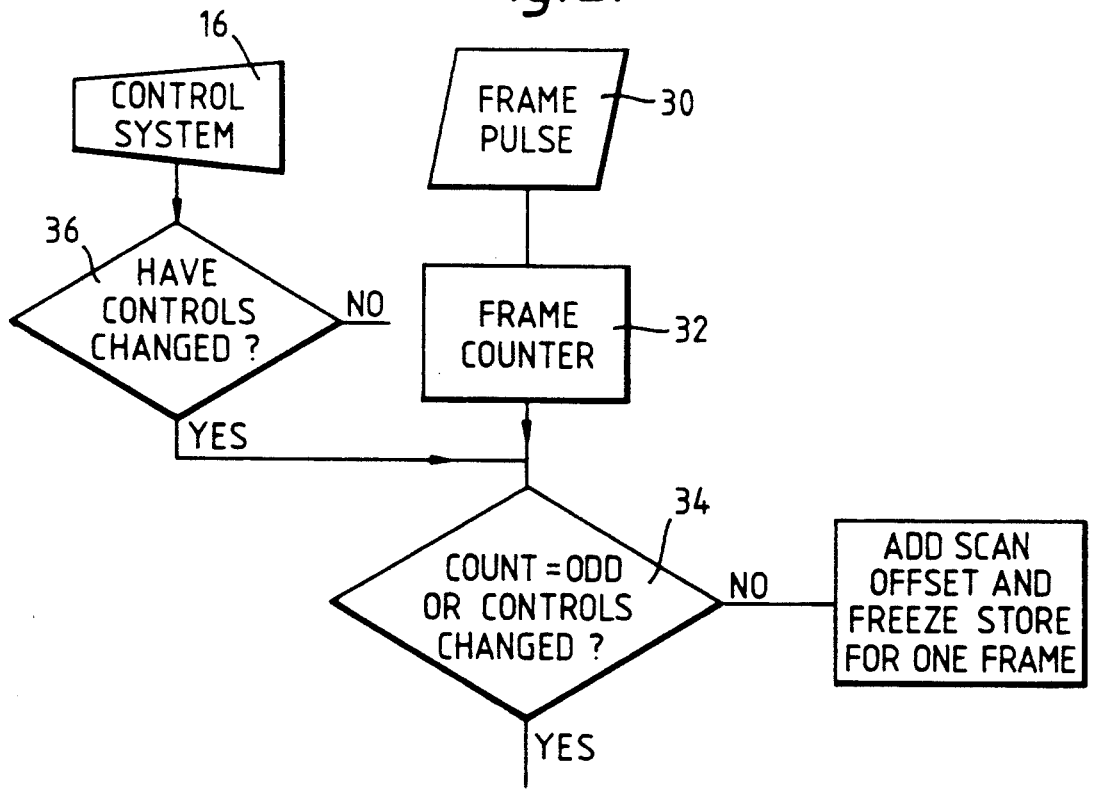
FIG. 2 is a flow chart explaining operation of the embodiment of the invention.

Turning now to FIG. 2 it can be seen that the process operates as follows:

Generation of a frame pulse from the frame store controller, at 30 increments a frame counter 32 in the scan controller which will be odd for the first time a frame has been scanned. If the count is odd, the frame is scanned normally. If the frame count is even and the scan controls are unchanged, (at 34), the scan control processor increments the vertical scan address to offset the scan by half a line and send a freeze signal to the frame store which retains and outputs again the previous video frame. Similarly, the control system 16 is examined every frame, at 36. If the controls have been changed, the frame is scanned normally.

In an alternative embodiment (not shown) interline scanning is used to compensate for burn in scanners when the film is driven using an intermittent motion pin register gate. Pin register gates pull down the film one frame at a time and the film when being scanned is stationary in the film gate. It is not practical to use the known slow vertical scan movement method described previously. However, the interline scan is appropriate both when the film is stationary and being advanced intermittently through the film gate.

In intermittent mode the film is scanned in the usual scan position and offset scanned before the pin register gate advances the film to bring the next frame into the film gate.

Various alternatives to the system described are possible and will occur to those skilled in the art. For example, a greater evenness of burn across the CRT phosphor may be achieved by counting the number of frames scanned in the correct position, remembering that there are extra frames when controls are being incremented, and the number of frames that are scanned with the offset, and adding extra offset frames to equalise the numbers. In a further modification the number of between line scanned frames (offset frames) is increased and the position of the offset scan is moved to several (two or more) different positions to merge the scan and offset scans move effectively and to produce a more uniform burn. The output video is frozen at the last valid, non-offset scan position for each of the offset scans so that the resultant picture remains unaffected. This technique is useful when the scan is coarse or where a high definition, high resolution scan is performed. One example of this technique is to perform two offset scans, one spaced ⅓ of a line from the previous scan and the other spaced ⅔ of a line from the previous scan. Although described with a ½ line offset, an offset of (n+½) lines where n is an integer may be used. Although a ½ line is preferable, the interline spacing may be different, for example ⅓ of ⅔.

A further modification is to freeze the video on the first scan of the film and to turn down the beam current, or turn it off, until the film was moved or a control adjusted. Whilst offset scanning is not compatible with switching the beam off, it is more preferable to reduce beam current as the phosphor takes some while to stabilise when the CRT beam is turned on. Offset scanning may then be performed at a reduced beam current.

The embodiments described all equalise burn by scanning a still frame normally moving the scan by less than one line spacing, rescanning and supressing the rescanned signal while repeating the video output for the normal scan.

An alternative possibility is to move the scan over a line spacing using a slow cyclic movement of one line amplitude. It is not practical to achieve this by moving the film but partial correction could be achieved by interpolating between lines in a frame store.

We claim:

1. A method for compensating for phosphor burn in a Cathode Ray Tube (CRT) of a flying spot film scanner which scans frames of film to convert between images stored on film and images represented by video signals, comprising:

scanning a frame of film with the CRT raster to produce a video signal representative of an image exposed on the film frame, the raster scan having a vertical component and a horizontal component;

storing the video signal in a frame store for output;

offsetting said vertical component of said scan by a distance equal to a non-integral scan line spacing;

performing an offset scan by rescanning said film frame in the offset position;

supressing the video signal produced by the offset scan; and repeating the signal stored in the frame store in place of the supressed signal.

2. A method according to claim 1; wherein the vertical scan offset is a distance less than the distance between adjacent scan lines.

3. A method according to claim 2; wherein the vertical scan offset is substantially equal to half the distance between two adjacent scan lines.

4. A method according to claim 1, comprising performing a plurality of offset scans, each of said offset scans being offset by a different amount with respect to said scan producing the video signal stored in said frame store;
   suppressing the video signal produced by each of said offset scans; and
   substituting the video signal stored in the frame store for the supressed signal.

5. A method according to claim 1, comprising disabling the steps of offsetting the scan suppressing the video signal and repeating the stored video signal if the film is moving through the scanner film gate.

6. A method according to claim 1: comprising disabling the steps of offsetting the scan, supressing the video signal and repreating the stored video signal if a control adjustment has been applied to the first scanned video signal stored in the frame store.

7. A method according to claim 6, comprising:
   counting the number of frames scanned to produce output video signals to the frame store;
   counting the number of offset scans having supressed outputs; and
   periodically inserting additional offset scans with supressed video outputs to increase the number of offset output supressed scans to n times the number of output producing scans produced while the film is stationary, where n is the number of offset scans produced for each video output producing scan.

8. A method according to claim 1, comprising:
   reducing the CRT beam current after scanning the frame of film to produce said video signal stored in said frame store; and
   restoring the beam current when the next video signal output from a frame scan is required.

9. Apparatus for compensating for phosphor burn in a cathode ray tube (CRT) of a flying spot film scanner which scans film to convert between images on film and images represented by video signals, comprising:
   means for controlling scanning of a frame of said film by the beam of said cathode ray tube to produce a video signal representative of an image exposed on said film frame, the CRT scan having a horizontal component and a vertical component; means for storing the video signal for subsequent output, wherein said scanning control means comprises:
   means for offsetting said vertical scan component of the scanner by a distance equal to a non-integral scan line spacing;
   the scanning control means further comprising means for controlling rescanning of said film frame with the vertical scan component offset by said offsetting means;
   the apparatus further comprising:
   means for supressing the video signal output by the offset means; and
   means for repeating the video signal stored in the frame store in place of the signal supressed by said supressing means.

10. Apparatus according to claim 9, wherein said means for offsetting said vertical scan component comprises means for offsetting said vertical scan component by a distance less than the distance between adjacent scan lines.

11. Apparatus according to the claim 10, wherein said means for offsetting said vertical scan component comprises means for offsetting said vertical scan component by a distance substantially equal to half the distance between adjacent scan lines.

12. Apparatus according to claim 9; wherein said means for offsetting said vertical scan component comprises means for incrementing or decrementing a digital vertical scan address.

13. Apparatus according to claim 9; wherein said means for offsetting the vertical scan component and said means for controlling rescanning comprise means for generating a plurality of offset scans, each offset scan being offset by a different amount with respect to the scan producing the stored video signal, and wherein the video signal output supressing means supresses the output of each offset scan and the means for repeating the stored video signal repeats the stored signal in place of each offset scan.

14. Apparatus according to claim 9, wherein said film scanner includes a film gate comprising means for disabling the vertical scan offsetting means when the film is moving through the scanner film gate.

15. Apparatus according to claim 9, comprising means for disabling the vertical scan offsetting means when a control adjustment has been applied said first scanned video signal stored in said frame store.

16. Apparatus according to claim 9, further comprising:
   first counting means for counting the number of frames scanned to produce output video signals to the frame store;
   second counting means for counting the number of offset scans having supressed outputs; and
   means for periodically inserting additional offset scans with supressed video outputs to increase the number of offset outputs supressed scans to n times the number of output producing scans produced scans produced with the film stationary, where n is the number of offset scans produced for each video output producing scan.

17. Apparatus according to claim 9, further comprising:
   means for reducing the CRT beam current after scanning a film frame to produce a video signal for output; and
   means for increasing the beam current when the next video signal output from a frame scan is required.

18. A flying spot telecine including apparatus according to any of claims 9 to 17.

19. A method of compensating of phosphor burn on the face of a CRT scanner comprising the steps of:
   scanning with a raster scan a frame of an image on film to produce an output video signal;
   storing the output signal;
   rescanning the frame in between the lines of the previous scan; and
   discarding the output from the rescanned frame.

* * * * *